US012433468B1

(12) United States Patent
Krause et al.

(10) Patent No.: US 12,433,468 B1
(45) Date of Patent: Oct. 7, 2025

(54) BARBECUE GRILL BRUSH (71) Applicant: SCRUB DADDY, INC., Pennsauken, NJ (US)

(72) Inventors: Aaron C. Krause, Voorhees, NJ (US); John O'Brien, Folcroft, PA (US); Aleksandrs Titovs, Folcroft, PA (US)

(73) Assignee: Scrub Daddy, Inc., Pennsauken, NJ (US)

( * ) Notice: Subject to any disclaimer, the term of this patent is extended or adjusted under 35 U.S.C. 154(b) by 0 days.

(21) Appl. No.: 19/244,874

(22) Filed: Jun. 20, 2025

Related U.S. Application Data (63) Continuation of application No. 18/709,147, filed as application No. PCT/US2023/012662 on Feb. 9, 2023.

(60) Provisional application No. 63/310,220, filed on Feb. 15, 2022.

(51) Int. Cl.
A47L 13/12 (2006.01)
A46B 5/02 (2006.01)
A46B 15/00 (2006.01)
A47J 37/07 (2006.01)
A47L 13/07 (2006.01)
A47L 13/08 (2006.01)
A47L 13/34 (2006.01)

(52) U.S. Cl.
CPC ............ A47L 13/12 (2013.01); A46B 5/021 (2013.01); A46B 15/0063 (2013.01); A47J 37/0786 (2013.01); A47L 13/07 (2013.01); A47L 13/08 (2013.01); A47L 13/34 (2013.01); A46B 2200/3033 (2013.01)

(58) Field of Classification Search
CPC ...... A47J 37/0786; A47L 13/34; A47L 13/04; A47L 13/06; A47L 13/07; A47L 13/08; A47L 13/12; A47L 17/06; A47L 17/08; A46B 2200/3033
USPC ........ 15/244.1–244.4, 229.11, 144.1; 16/430
See application file for complete search history.

(56) References Cited

U.S. PATENT DOCUMENTS 4,091,579 A * 5/1978 Giangiulio ............... B08B 1/12
  451/461
5,373,600 A 12/1994 Stojanovski et al.
6,216,306 B1 * 4/2001 Esterson .................. A46B 7/04
  D4/118

(Continued)

FOREIGN PATENT DOCUMENTS

WO  WO 2007/036752 A1 * 4/2007 ............. A47L 17/08

OTHER PUBLICATIONS

International Search Report and Written Opinion for PCT/US2023/012662, mailing date May 10, 2023, 10 pages.

(Continued)

Primary Examiner — Laura C Guidotti
(74) Attorney, Agent, or Firm — Sterne, Kessler, Goldstein &Fox P.L.L.C.

(57) ABSTRACT

A barbeque grill brush includes an elongated brush handle with a handle grip extending perpendicularly from one end thereof. The other end of the brush handle includes a brush holder that carries two rigid metal scrapers and a brush head. The brush head is carried by a brush attachment that is adapted to be secured to or removed from the brush holder. The brush head is comprised of a stainless steel mesh covered foam. The foam has the characteristics of being firm when cold but soft when heated.

16 Claims, 7 Drawing Sheets (56) References Cited

U.S. PATENT DOCUMENTS

| | | | |
|---|---|---|---|
| 6,553,627 B1* | 4/2003 | Horler | B25G 1/00 |
| | | | 16/427 |
| 6,732,411 B2* | 5/2004 | Vidal | B25G 1/102 |
| | | | 16/DIG. 12 |
| 8,202,016 B2 | 6/2012 | Wales | |
| 8,438,687 B2* | 5/2013 | Cybulski | A47J 37/0786 |
| | | | 15/210.1 |
| 8,438,688 B2 | 5/2013 | Weinberger et al. | |
| D1,036,128 S* | 7/2024 | Liang | D4/118 |
| D1,062,247 S* | 2/2025 | Chen | D4/118 |
| 2009/0056748 A1* | 3/2009 | Wales | A47L 13/34 |
| | | | 15/104.94 |
| 2012/0079667 A1 | 4/2012 | Ashner, II | |
| 2016/0213221 A1 | 7/2016 | Krause et al. | |

OTHER PUBLICATIONS

Video entitled BBQ Daddy Brush—Clean Your Grill with Steam!, available at <https://www.youtube.com/watch?v=92ufDYxzfCs> (Scrub Daddy) Apr. 7, 2022 (Apr. 7, 2022), entire document.

* cited by examiner

BARBECUE GRILL BRUSH

TECHNICAL FIELD

The invention relates to a brush and scraper of the kind used to clean barbecue grills and similar cooking surfaces.

BACKGROUND ART

Barbecuing food, particularly in the summer, is a very popular activity for many people, especially in the suburbs. As is well known in the art, barbecue grills come in many shapes and sizes and the heat source may come from propane or natural gas, charcoal, or wood or the like. All barbecue grills, however, include a cooking surface comprised of a grate made of a series of parallel metal bars.

When cooking on the grate, juices from the food and from sauces and the like spread on the food accumulates on the grate and must, from time to time, be removed. This is normally done with a grill brush and/or scraper. Over the years, numerous different brushes have been proposed. While they all have some cleaning effect, the majority do not effectively remove the accumulated deposits and many are difficult to use.

One brush that has met with some success is shown and described in U.S. Pat. No. 8,202,016, the entire contents of which are incorporated herein by reference. This prior brush, however, continues to suffer from various drawbacks which the present invention is designed to overcome.

SUMMARY OF THE INVENTION

A barbeque grill brush includes an elongated brush handle with a handle grip extending perpendicularly from one end thereof. The other end of the brush handle includes a brush holder that carries two rigid metal scrapers and a brush head. The brush head is carried by a brush attachment that is adapted to be secured to or removed from the brush holder. The brush head is comprised of a stainless steel mesh covered foam. The foam has the characteristics of being firm when cold but soft when heated.

DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

DETAILED DESCRIPTION OF THE PREFERRED EMBODIMENT

Referring now to the drawings in detail wherein like reference numerals have been used throughout the various figures to designate like elements, there is shown in FIGS. 1-9 a barbecue grill brush constructed in accordance with the principles of the present invention and designated generally as 10.

The brush 10 is comprised of an elongated brush handle 12 having a hand grip 14 at one end thereof and a brush holder 16 at the other end. As viewed in FIG. 1, the hand grip 14 extends downwardly at approximately 90° to the curved axis of the main handle 12. The hand grip 14 also includes a plurality of finger indentations 18 which makes it easier for a person to grasp the same as seen in FIG. 4.

Figure 6:
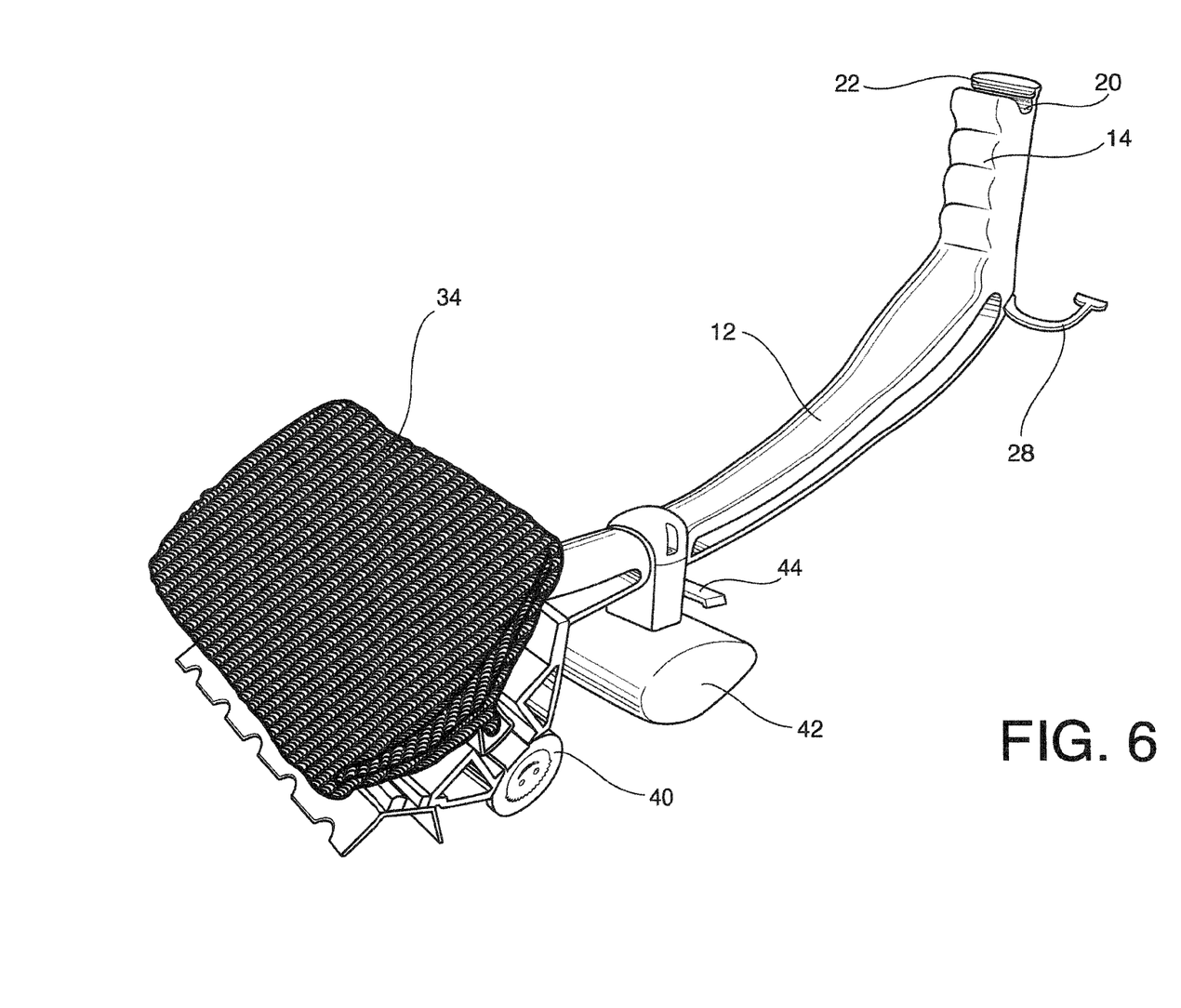
FIG. 6 is a perspective view similar to FIG. 5 showing the bottle opening feature of the invention.
Figures 7, 8:
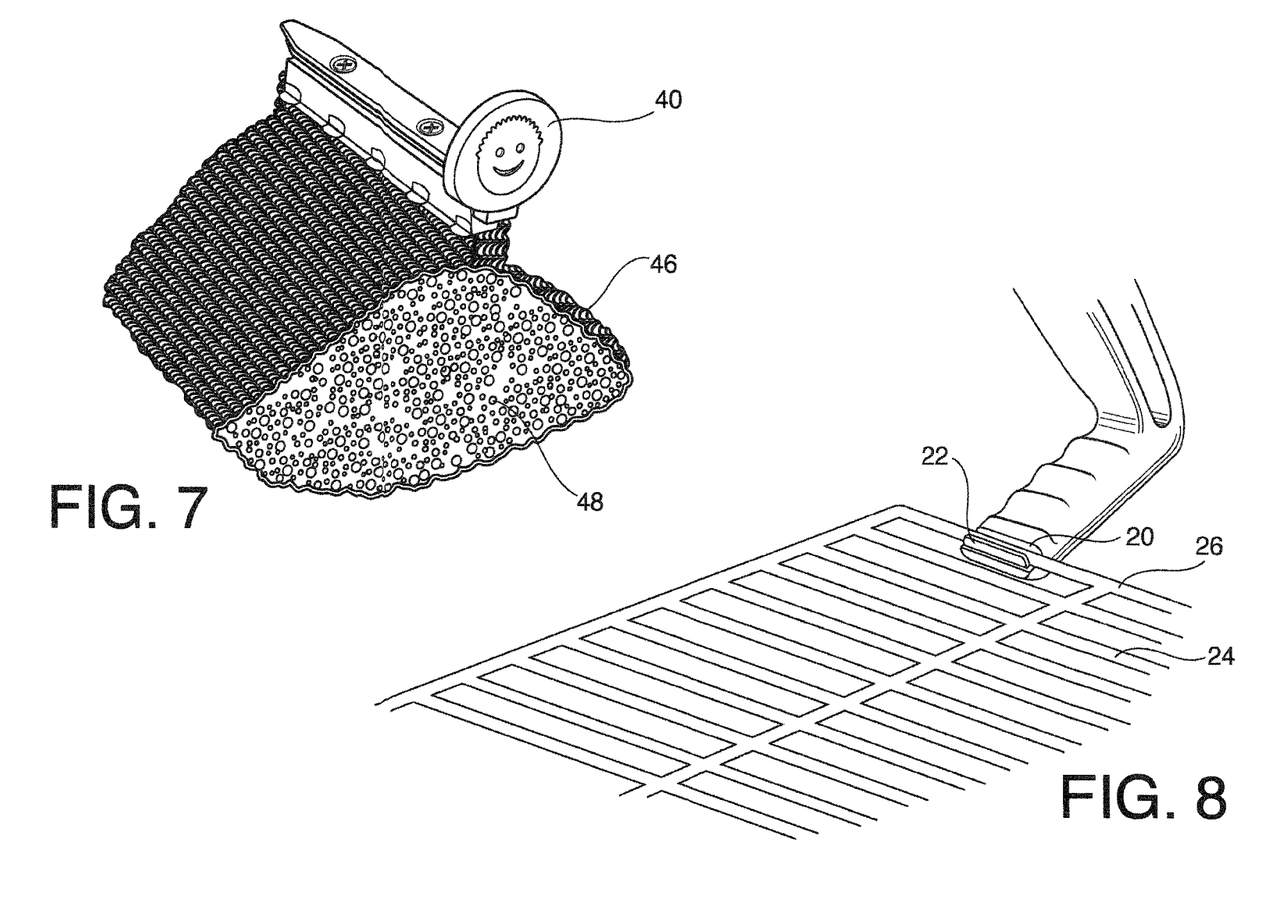
FIG. 7 is a partial cross-sectional view of the brush head of the invention.
FIG. 8 illustrates the manner in which a portion of the grill brush can be used to lift a grate from a barbecue grill.
Figure 9:
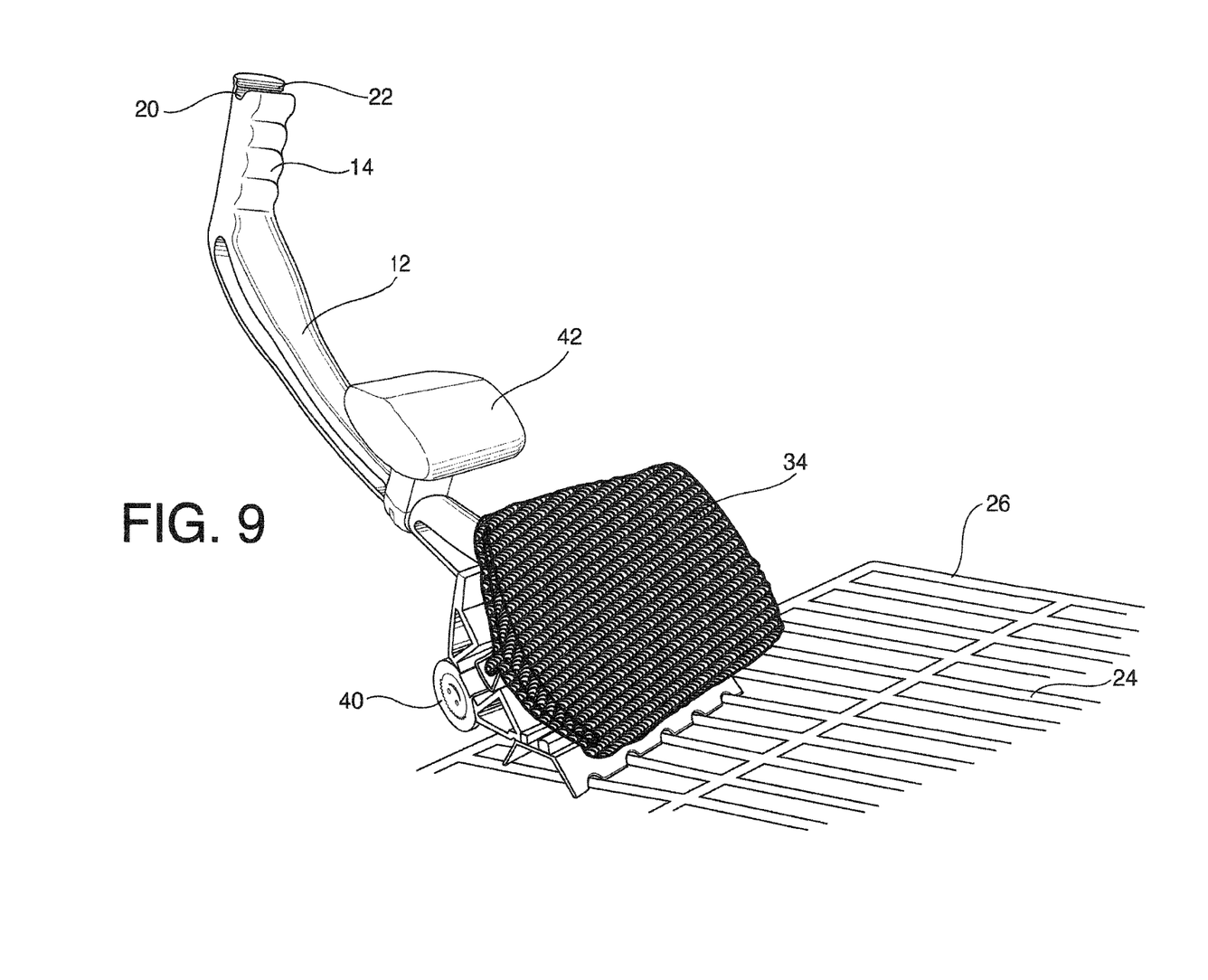
FIG. 9 is a view illustrating how the brush of the present invention is used for scraping a grate of a barbecue grill.

The very bottom rear end of the handle grip 14 also includes a transverse recess 20 bordered adjacent the top of the recess by a metal extension 22. As best seen in FIG. 8, the combination of the recess or slot 20 and the metal extension 22 can be used to lift a barbecue grate 24 by engaging one of the bars 26 thereof. The upper end of the handle grip also includes a bottle opener 28 that is pivotally connected thereto so that it can either be exposed for use as shown in FIG. 6 or rotated into a slot in the rear of the handle grip so as to be out of the way.

Figure 1:
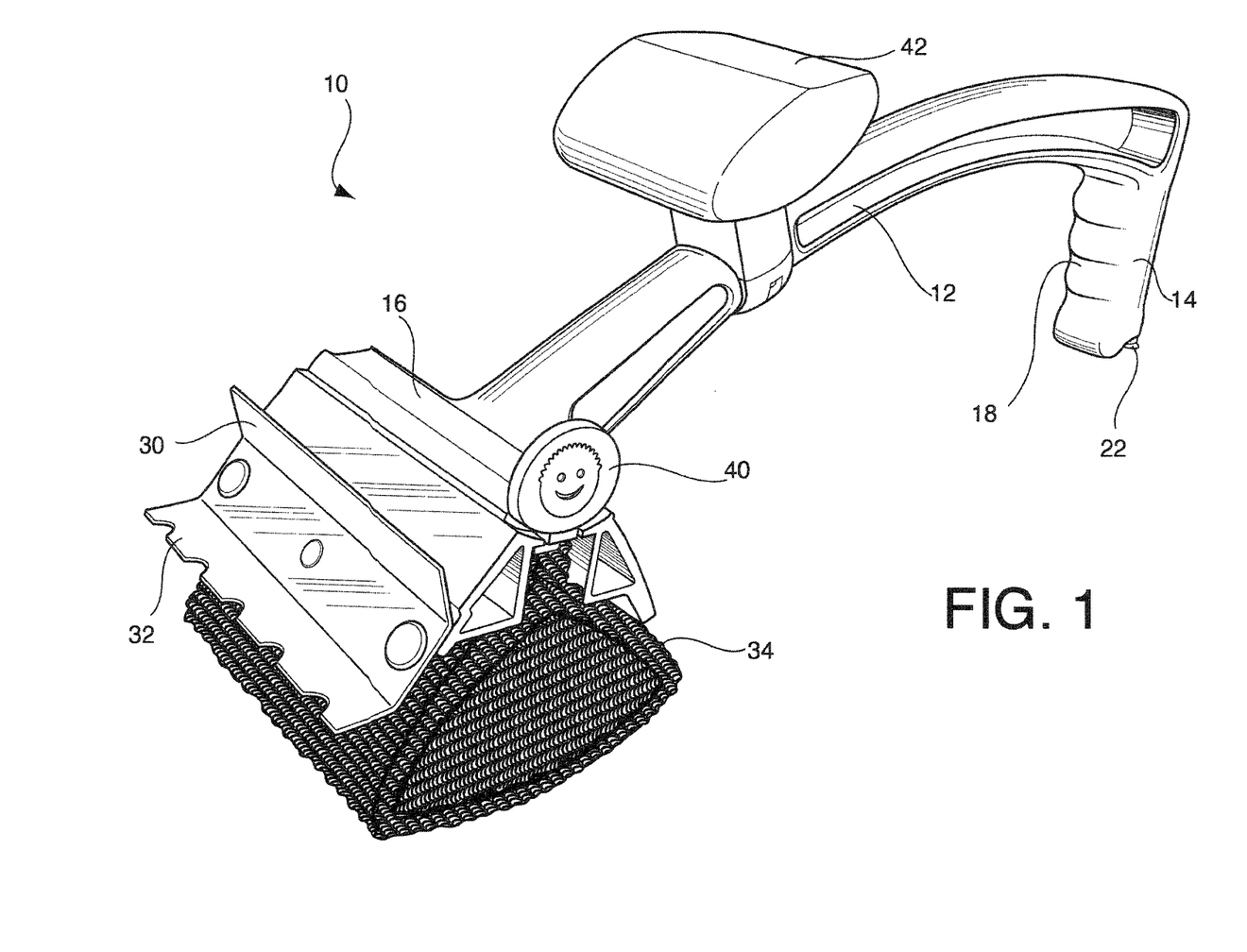
FIG. 1 is a front and top perspective view of a barbecue grill brush of the invention.
Figures 2, 3:
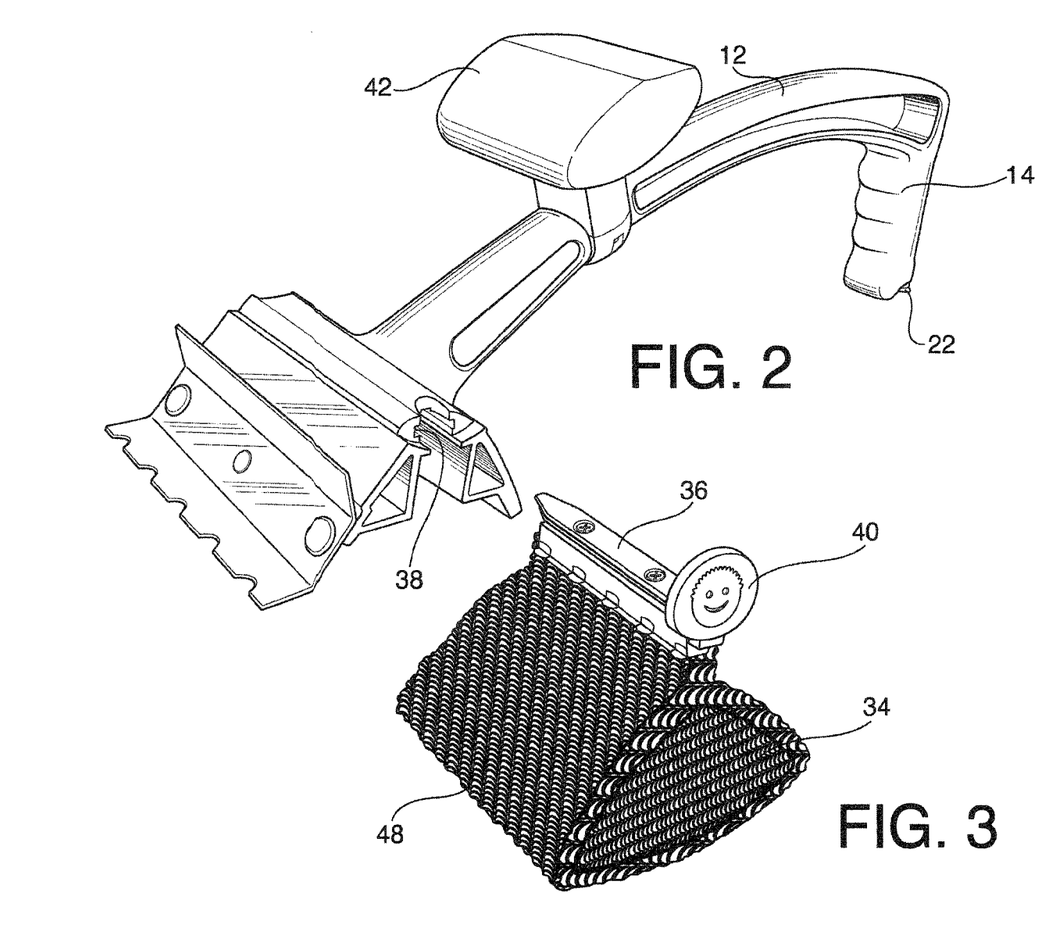
FIG. 2 is a view similar to FIG. 1 but partially in cross-section and with the brush head removed.
FIG. 3 is a perspective view of the brush head of the invention.

The brush holder 16, at the other end of the handle 14, includes a transverse straight metal scraper 30 and a transverse grooved metal scraper 32 at the top of the grill brush 10 as viewed from FIG. 1. Extending downwardly from the brushholder 16 (as viewed in FIG. 1) is the brush head 34. As shown most clearly in FIGS. 2 and 3, the brush head 34 can be removed from the brush holder 16 and reinserted therein through the use of the brush attachment 36 that can slide into and out of the slotted groove 38. This allows the brush head 34 to be removed for cleaning or replacement. The thumb handle 40 on the end of the brush attachment 36 makes it easier to remove or insert the same into the groove 38.

Figure 4:
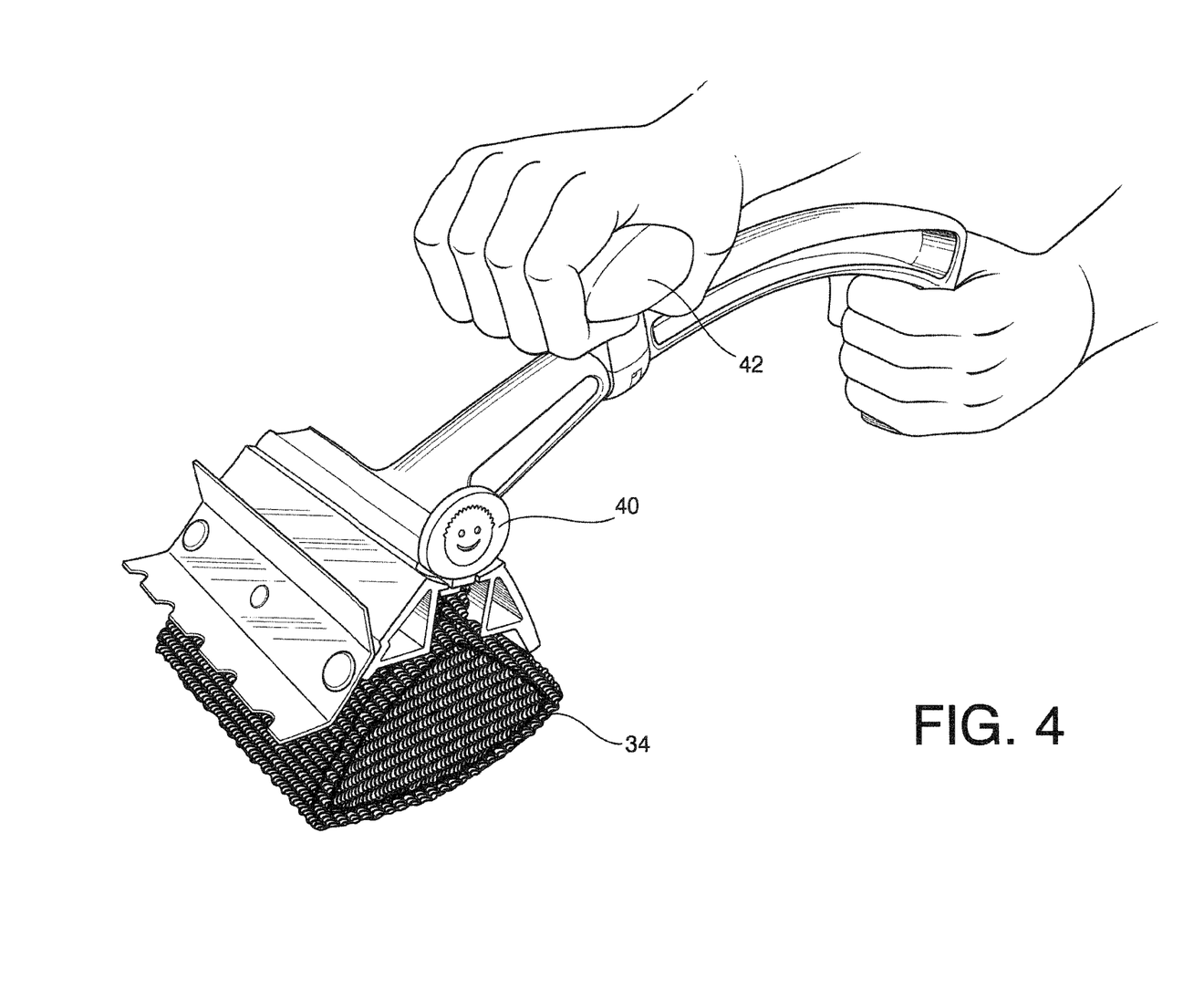
FIG. 4 is a perspective view similar to FIG. 1 illustrating the manner in which the brush of the invention may be held during use.
Figure 5:
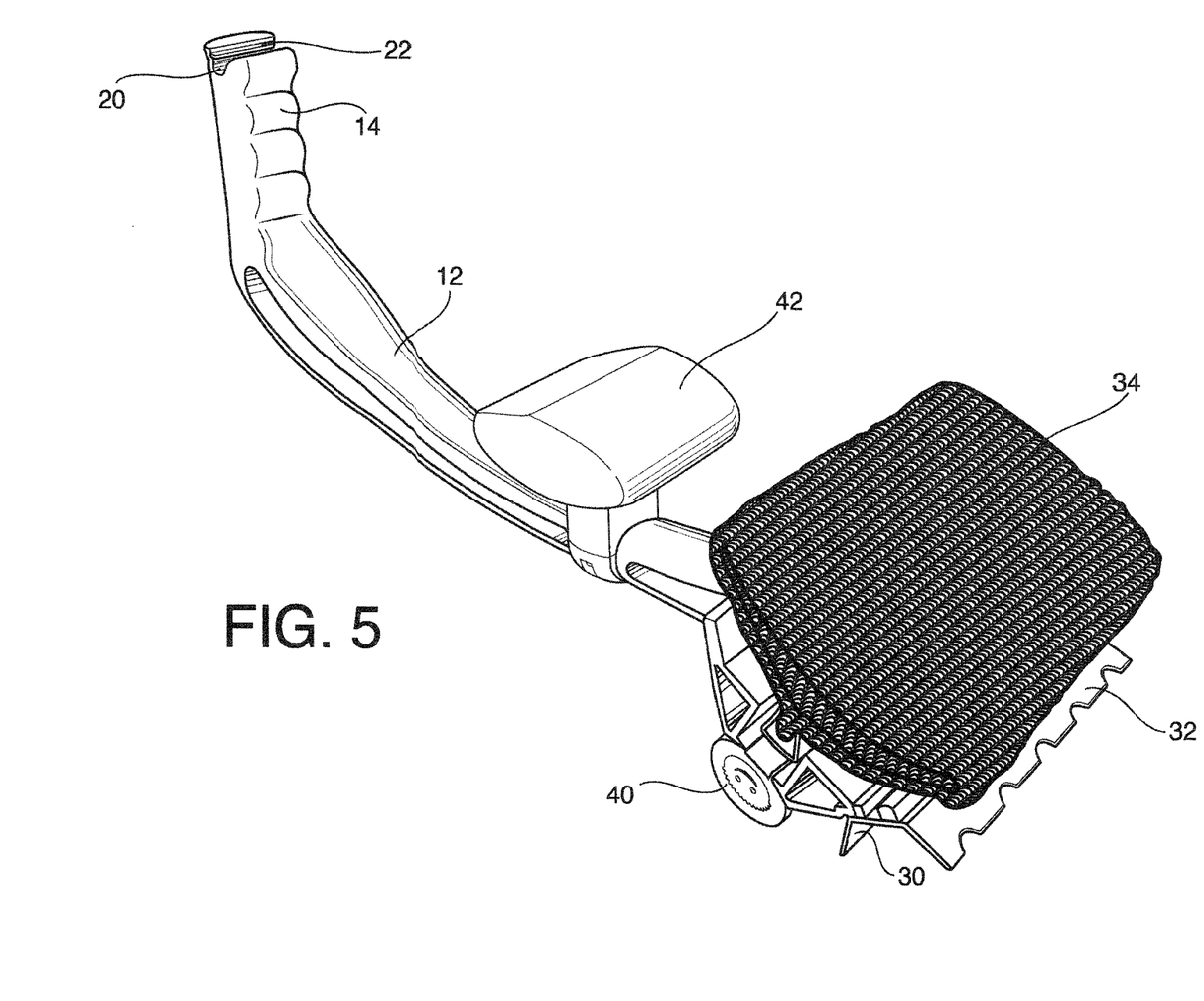
FIG. 5 is a perspective view of the barbecue grill brush of the invention inverted for use in a slightly different manner and having the knob rotated.

As shown in FIG. 4, when it is desired to clean a grate 24 with the brushhead 34, a person holds the handle grip 14 with one hand and the knob 42 (located intermediate the two ends of the brush handle) with the other hand. Putting downward pressure on the knob 42 makes it easier to clean the grate and it is also easier on the hands and arms of the person cleaning the grate 24.

Sometimes, however, it is desired to use the straight metal scraper 30 or the grooved metal scraper 32 to clean the grate 24. To accomplish this, the barbecue brush 10 is inverted so as to be in the position shown in FIGS. 6 and 9. In order that the knob 42 can also be used in this position, it is mounted on the brush handle 12 so as to be rotatable relative thereto. This allows the knob to be moved between the position shown in FIG. 1 and the position shown in FIG. 9. Means are also provided to insure that the knob 42 locks into one of the two desired positions. A lever 44 is used to release the lock to allow for rotation.

The brush head 34 is comprised essentially of two parts: an outer stainless steel mesh cover 46 and inner foam 48. The foam 48 is preferably made from a specific foam material such as that described in our prior U.S. Published Application No. 2016/0213221, published on Jul. 28, 2016, the entire contents of which are incorporated herein by reference. As explained therein and in Applicant's prior U.S.

Published Application No. 2014/0075699 (the entire contents of which are also incorporated herein by reference) the foam 48 has the characteristics of being relatively rigid at cold temperatures, such as 50-60° F., for example, but becomes softened at elevated temperatures above 100° F., for example. This is accomplished by utilizing base thermoplastic materials such as polyurethanes, polyesters and related compositions and mixing them with thermoplastic materials that may have soft or putty-like characteristics at different temperatures. Examples are capero-lactones and related thermoplastics such as sold under the names Protoplast or Draco. As is also well known in the art, polymer compositions can be further cross-linked for increased temperature settings, durability, structural strength and the like. In addition, various other additives can be employed.

The foam 48 in the brush head 34 made from the materials described above will have the characteristics of being relatively firm or rigid at cold temperatures but relatively soft at elevated temperatures. In use, the brush head 34 is first dipped into cold water to make it hard, initially, therefore, the brush head is hard and can effectively scrape the grate to clean it. As the brush head 34 continues to clean the hot grate 24, the foam softens. This allows the brush head to mold itself around the grate bars to clean the sides thereof. After use, the brush head can then again be immersed in cold water and regain its hardness.

Although the invention has been described in accordance with the preferred embodiment, it will be appreciated by those skilled in the art that the application of the present invention is useful in a variety of configurations and designs not specifically described above. All such designs and applications are considered to be within the scope of the present disclosure, and the invention is applicable across a wide variety of applications. Such applications are considered within the scope and spirit of the present invention.

Insofar as the description above and the accompanying drawings disclose any additional subject matter that is not within the scope of the claims below, the inventions are not dedicated to the public and the right to file other applications to claim any additional inventions is reserved.

What is claimed is:

1. A barbecue grill brush comprising:
    an elongated brush handle having a first end and a second end opposite the first end;
    a hand grip coupled to the first end of the elongated brush handle, the hand grip extending downwardly from the elongated brush handle;
    a brush holder coupled to the second end of the elongated brush handle;
    a brush head removably coupled to the brush holder;
    a metal scraper disposed at the second end of the elongated brush handle; and
    a knob rotatably coupled to the elongated brush handle, wherein the knob rotates about the elongated brush handle between a first position in which the knob extends downwardly from the elongated brush handle and a second position in which the knob extends upwardly from the elongated brush handle.

2. The barbeque grill brush of claim 1, wherein the knob is disposed between the first end and the second end of the elongated brush handle.

3. The barbeque grill brush of claim 1, further comprising a lock to secure the knob into the first position or the second position.

4. The barbeque grill brush of claim 3, further comprising a lever to release the lock.

5. The barbeque grill brush of claim 1, wherein the hand grip comprises a recess and a metal extension disposed adjacent to the recess.

6. The barbeque grill brush of claim 1, wherein the metal scraper is a straight metal scraper, a grooved metal scraper, or a combination thereof.

7. The barbeque grill brush of claim 1, wherein the brush head comprises a foam that is rigid when cooled and soft when heated.

8. The barbecue grill brush of claim 7, further comprising a stainless steel mesh disposed around an exterior of the foam.

9. The barbeque grill brush of claim 1, wherein the brush holder comprises a groove.

10. The barbeque grill brush of claim 9, wherein the brush head comprises a brush attachment to slidably couple to the groove of the brush holder.

11. A barbecue grill brush comprising:
    an elongated brush handle having a first end and a second end opposite the first end;
    a hand grip at the first end of the elongated brush handle;
    a brush head removably coupled to the second end of the elongated brush handle;
    a metal scraper disposed at the second end of the elongated brush handle; and
    a knob rotatably coupled to the elongated brush handle intermediate the first end and the second end such that the knob rotates about the elongated brush handle between a first position in which the knob extends downwardly from the elongated brush handle, and a second position in which the knob extends upwardly from the elongated brush handle.

12. The barbeque grill brush of claim 11, further comprising a lock to secure the knob into the first position or the second position.

13. The barbeque grill brush of claim 12, further comprising a lever to release the lock.

14. The barbeque grill brush of claim 11, further comprising a brush holder coupled to the second end of the elongated brush handle, the brush head being removably coupled to the brush holder.

15. The barbeque grill brush of claim 14, wherein the brush holder comprises a groove.

16. The barbeque grill brush of claim 15, wherein the brush head comprises a brush attachment to slidably couple to the groove of the brush holder.

* * * * *